United States Patent [19]

Graves

[11] Patent Number: 4,667,324

[45] Date of Patent: May 19, 1987

[54] NETWORK MULTIPLEX STRUCTURE

[75] Inventor: Alan F. Graves, Sherwood Park, Canada

[73] Assignee: Northern Telecom Limited, Montreal, Canada

[21] Appl. No.: 773,917

[22] Filed: Sep. 9, 1985

[51] Int. Cl.[4] .......................... H04J 3/06; H04L 7/00
[52] U.S. Cl. ...................................... 370/102; 375/112
[58] Field of Search ................. 370/100, 102; 375/112

[56] References Cited

U.S. PATENT DOCUMENTS 3,946,161  3/1976  Husted et al. ...................... 370/102
4,147,895  4/1979  Fenoglio ............................. 370/102
4,542,500  9/1985  Jean-Claude ....................... 370/102

*Primary Examiner*—Douglas W. Olms
*Assistant Examiner*—Frank M. Scutch, III
*Attorney, Agent, or Firm*—John E. Mowle

[57] ABSTRACT

A time-division multiplexed digital transmission system which utilizes single stage multiplexing and demultiplexing for both synchronous and/or asynchronous bit streams from tributaries of widely differing bit rates. This is achieved by bit stuffing each of the tributaries so as to establish a harmonic relationship at their channel level and then at their tributary level of all the bit streams being multiplexed.

10 Claims, 7 Drawing Figures

NETWORK MULTIPLEX STRUCTURE

This invention relates to a time-division multiplexed digital transmission system and more particularly to such a system utilizing single stage multiplexing and demultiplexing of both synchronous and/or asynchronous bit streams from tributaries of widely differing bit rates, which permits direct access to individual synchronous channels, or to complete synchronous or asynchronous tributaries, thus facilitating time-division switching or cross-connection thereof, either before or after transmission.

BACKGROUND OF THE INVENTION

In digital transmission, particularly as applied to telephony, recommended standards have been developed for the transmission of pulse code modulated (PCM) signals. A standard signal bit stream having a level designation DS-1 is formed from a plurality of 24 words or channels having a level designation of DS-0. In each of the transmission systems, the frame repetition rate =8000 Hz (frame period=125 us) and the number of PCM bits per channel n=8. The following are additional parameters of some of the standard transmission bit streams.

| DESIG-NATION | BIT RATE (kb/s) | CHANNELS PER FRAME | OVERHEAD BITS PER 125 us |
| --- | --- | --- | --- |
| DS-0 | 64 | 1 | — |
| DS-1 | 1544 | 24 | 1 |
| DS-1C | 3152 | 48 | 10 |
| DS-2 | 6312 | 96 | 21 |
| DS-3 | 44736 | 672 | 216 |

As shown, each of the multi-channel bit streams at the various bit rates include some additional overhead bits which provide synchronization and signalling control. In one higher order system two tributaries at the DS-1 rate may be multiplexed together with some additional control signals to form a bit stream at the DS-1C bit rate. Similarly, four tributaries at the DS-1 rate may be multiplexed to form a bit stream at the DS-2 rate. Likewise, seven DS-2 tributaries may be multiplexed together with further control bits to form a bit stream at the DS-3 bit rate. Thus the existing standard hierarchy is comprised of a plurality of signal levels, each one of which is generated by multiplexing a specified number of the next lowest signal level in the hierarchy in such a manner that all signals below that level are no longer accessible in the multiplexed structure without completely demultiplexing the signal. Many of the additional control bits are utilized to signal the insertion of additional bits (i.e. pulse stuffing) in the bit streams of each of the tributaries in order to increase their bit rates to a common higher bit rate so that the signals from the tributaries may be directly interleaved even though they may be asynchronous with each other or the higher-order bit stream.

The techniques for both pulse stuffing and multiplexing are well known and have been described in U.S. Pat. No. 3,136,861 entitled "PCM Network Synchronization" issued Jun. 9, 1964 to John S. Mayo. A typical prior art system utilizing these techniques is shown in FIG. 1, which illustrates an exemplary portion of a multiplexed digital transmission system in which a plurality of tributaries at the primary bit rate are multiplexed to second and third order bit rates. In the system, PCM signals from twenty-four 64 kb/s channels CH1, CH2–CH24, are multiplexed in a multiplexer M1 together with a synchronization bit to form a DS-1 bit stream at its output. Up to four such tributaries are bit stuffed in a stuffer S1 and then multiplexed in a multiplexer M2 together with further control bits to produce a DS-2 bit stream at its output. Seven such tributaries are then further bit stuffed in a stuffer S3 and multiplexed in a multiplexer M3 together with still further control bits to produce a DS-3 bit stream. The DS-3 bit stream is then transmitted from transmitter Tx to receiver Rx whereupon it is demultiplexed back down to the individual channel levels through destuffers T2 and T1, and demultiplexers D3, D2, and D1, in a converse manner. Similar multiplexing structures may be used to generate even higher-order bit streams utilizing the same principles.

This prior art arrangement functioned well in the past because it spread the stuffing bits throughout the bit stream thereby minimizing the requirements for memory buffers which were a significant cost factor in earlier systems. However such systems lacked a great deal of flexibility since it was not possible to recover selected channels directly from the higher-order bit stream without demultiplexing each of the intermediate order bit streams of the tributaries containing those channels. The problem was exacerbated if the selected channels were from different tributaries. Such prior art multiplex schemes also had to sacrifice networking features and characteristics for bandwidth efficiency due to the constraints of transmission equipment whereas, with modern systems bandwidth efficiency can be traded for networking features such as ease of implementation of the cross-connect and ease of access to digital switches.

In certain applications, there is often a requirement to access only a few such channels at an intermediate point along a system. In prior systems it was necessary to demultiplex and destuff the signals from each higher-order level before the next lower-order level could be demultiplexed. It was not possible to go directly from the received bit stream to the channel level in a single demultiplexer. As a result, there was considerable overhead required to access even one channel of the higher-order bit stream.

In a converse arrangement, both bit stuffing and multiplexing at each of the intermediate levels, were required in order to insert even a few channels from one or more tributaries in the higher-order bit stream. Such an arrangement severely limited the flexibility of any integrated digital transmission and digital switching system where it was desired to either switch or cross-connect individual channels or tributaries without demultiplexing the entire bit stream through each of the individual stages.

STATEMENT OF THE INVENTION

The present invention provides an arrangement in which various standard tributaries (as well as other such tributaries), either synchronous or asynchronous, at different order bit rates, can be multiplexed or demultiplexed in a single stage network thus eliminating the necessity for intermediate stages. Moreover, the multiplexed structure of the resultant bit stream is such that for any synchronous tributary which itself permits direct channel access or access to lower level multiplexed signals that channel access is maintained in the multiplexed final bit stream irrespective of the capacity of the tributary, thus permitting individual channels or imbedded carriers of those tributaries to be directly recovered from or inserted in the high order bit stream. Consequently, it is possible to switch or cross-connect any number of channels or imbedded carriers from one or more of the synchronous tributaries within the multiplexed bit stream without disturbing any of the other tributaries. This is implemented by establishing a harmonic relationship between the different bit rates of the various bit streams. Initially this appears to be virtually impossible to achieve since there are no easily discernible relationships between the bit rates of the various standard tributaries (i.e. DS-3: DS-2: DS-1=28.974093: 4.0880829: 1). The present invention overcomes this problem by first establishing a harmonic relationship at the channel level and thence at the tributary level.

Thus, in accordance with the present invention there is provided a digital transmission system comprising a time-division multiplexer for multiplexing bit streams from a pluralilty of tributaries into a multiplexed bit stream, at least one of the bit streams being divisible into frames, each frame being divisible into a plurality of channels of equal bit length and also having at least one additional overhead control (e.g. synchronization and/or signalling bit). The multiplexer is characterized by circuitry for stuffing additional bits in the one bit stream to increase the resultant number of bits in each frame to an integer multiple of the number of bits per channel. It is also characterized by circuitry for stuffing additional bits in each of the other bit streams to increase the resultant number of bits from each of the other frames in the multiplexed bit stream to an integer multiple of the number of bits per frame of the one bit stream. Thus, by adding selected numbers of additional bits to make the number of bits per frame of the one bit stream an integer number of the number of bits per channel, and to make the number of bits per frame of each of the other bit streams an integer number of the number of bits per frame of the one bit stream long, all of the tributaries synchronous with the one bit stream can be readily multiplexed or demultiplexed to the channel level in a single stage. Utilizing the same criteria, all other bit streams which are asynchronous with the one bit stream, can be demultiplexed or multiplexed to or from the tributary level in the same single stage.

BRIEF DESCRIPTION OF THE DRAWINGS

An example embodiment of the invention will now be described with reference to the accompanying drawings in which.

DESCRIPTION OF THE PREFERRED EMBODIMENT

Figure 2:
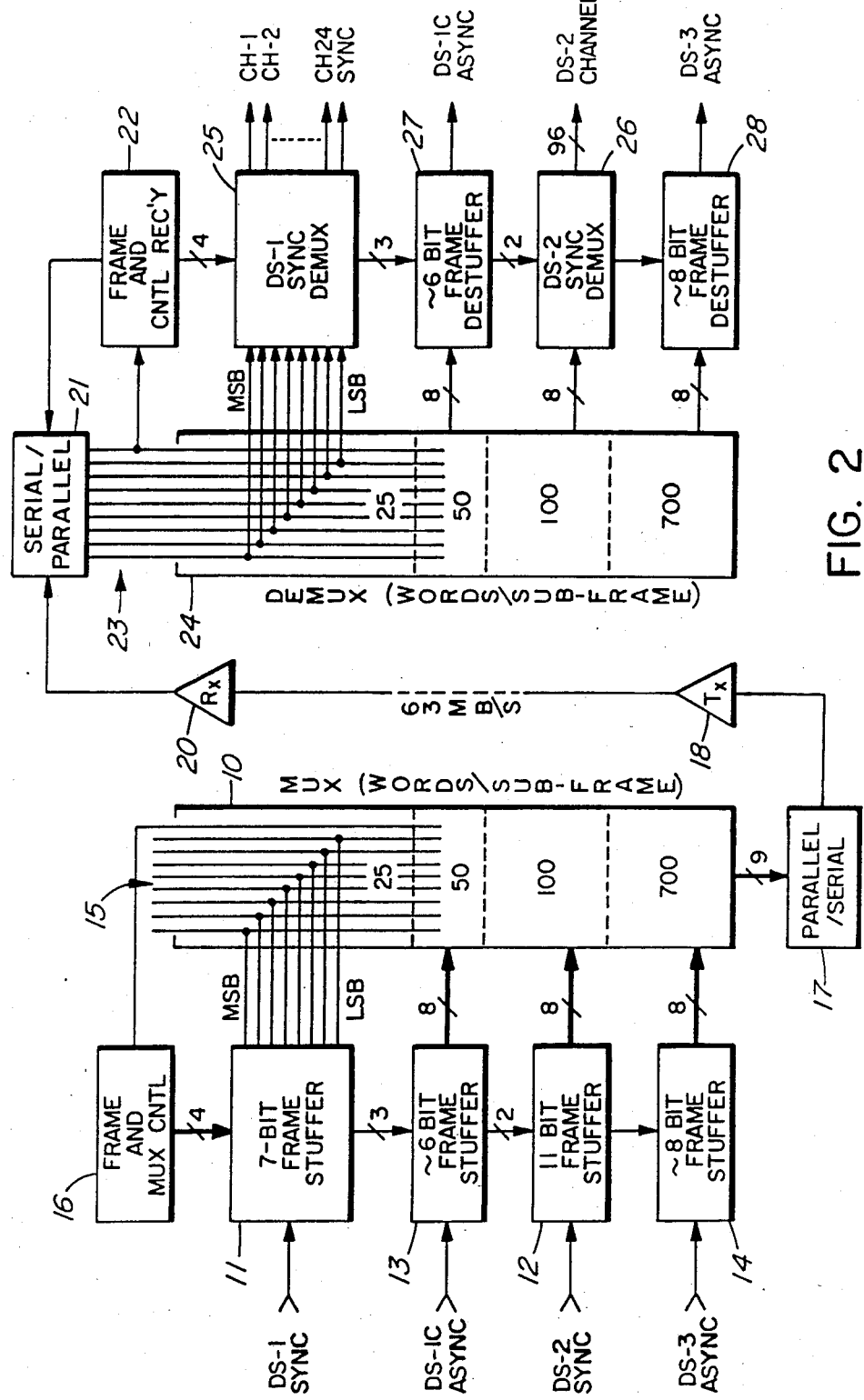
FIG. 2 is a general block diagram of a multiplexed digital transmission system in accordance with the present invention.
Figure 3:
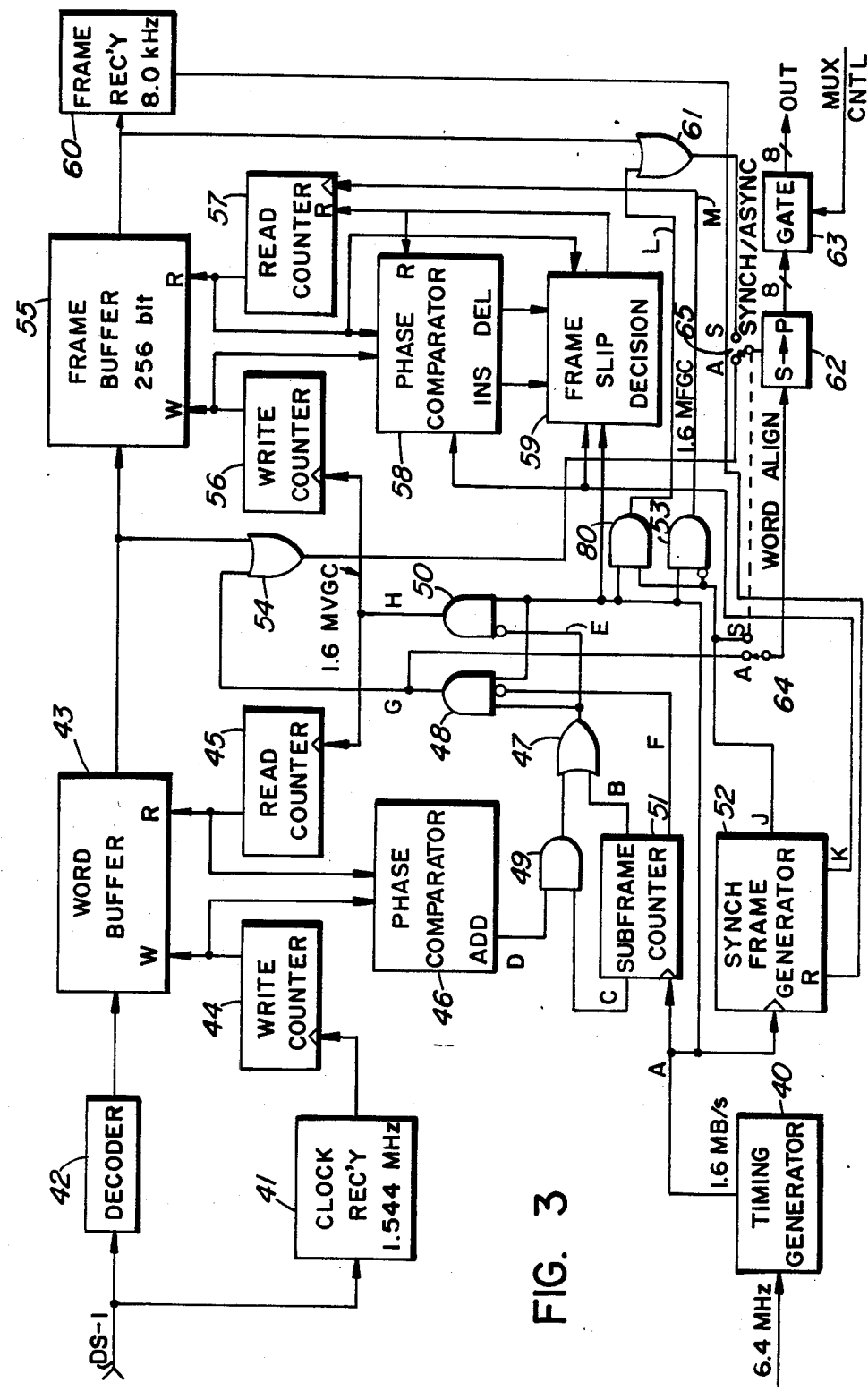
FIG. 3 is a block and schematic diagram of a DS-1 synchronous or asynchronous frame stuffer which forms part of the multiplexed digital transmission system illustrated in FIG. 2.

The detailed structure of the multiplexed digital transmission system illustrated in FIG. 2 will be readily apparent from the following circuit description of its function and operation illustrated in more detail in FIG. 3 when taken in conjunction with the various timing waveforms illustrated in FIGS. 4, 5, 6 and 7.

Figure 4:
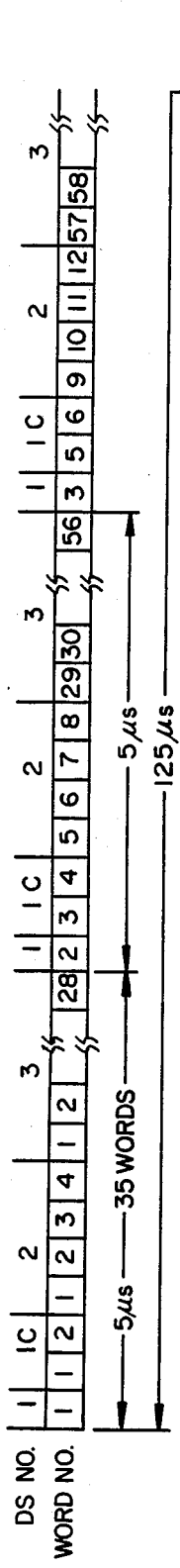
FIG. 4 illustrates the interleaving of the channel words from the various tributaries in the multiplexed digital transmission system illustrated in FIG. 2.
Figure 4:
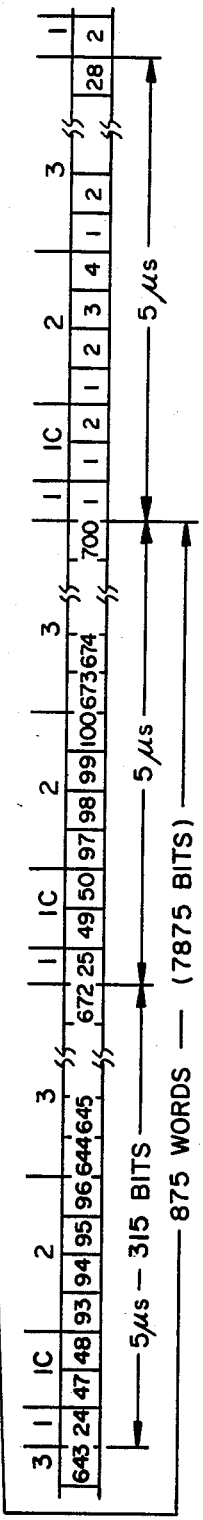
Figure 5:
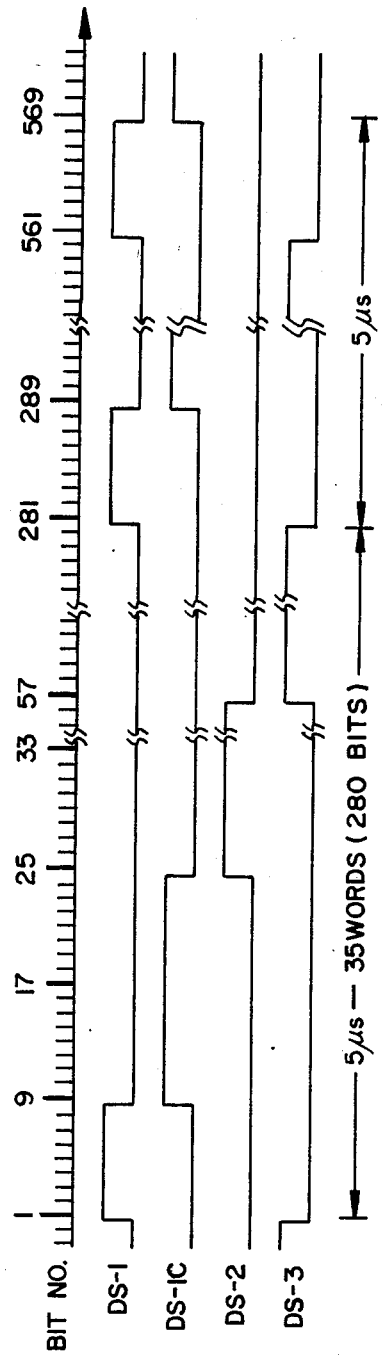
FIG. 5 illustrates typical gate control waveforms for interleaving the channel words from the various tributaries in the multiplexed digital transmission system illustrated in FIG. 2, FIGS. 6 and 7 illustrate typical gate control waveforms for controlling the stuffing of bits in the DS-1 frame stuffer illustrated in FIG. 3 during asynchronous and synchronous operation respectively.
Figure 6:
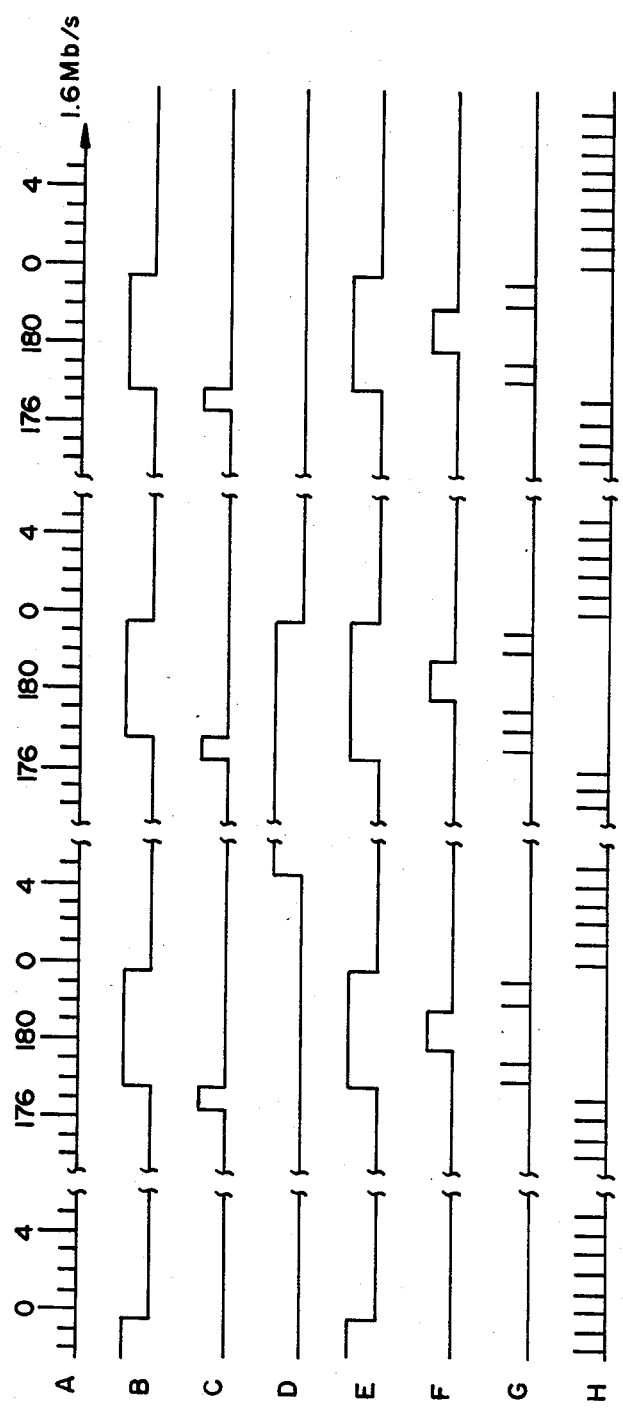

In the accompanying drawings, the digital waveforms illustrated in FIGS. 5 and 6 are identified by corresponding reference characters generated by timing generators in FIGS. 2 and 3 respectively. It will be evident that the time scales of the waveforms illustrated in FIGS. 4 and 5 differ widely from each other as evidenced by the relative length of the 5 us time intervals illustrated therein. In addition each of the 8-bit interleaved words illustrated in FIG. 4 includes an additional control bit so that the total number of bits per 5 us subframe is 9/8 that shown in FIG. 5.

The multiplexed digital transmission system illustrated in FIG. 2 combines the inputs from a bit-stuffed synchronous DS-1 tributary with bit-stuffed asynchronous DS-1C and DS-3 tributaries, and a bit-stuffed synchronous DS-2 tributary in a single-stage multiplexer. Conversely, each of these tributaries is demultiplexed in a single-stage demultiplexer. Since in this example embodiment both the DS-1 and DS-2 tributaries are synchronous, they can each be demultiplexed to the DS-0 channel level in the single-stage demultiplexer. This is possible because each tributary is bit-stuffed so that the total number of bits per frame from each tributary is an integer multiple of the number of bits per channel, and the total number of channels in the higher-order bit streams is an integer multiple of the number of channels in the lowest-order tributary. Thus, each tributary must be bit-stuffed to an integer multiple of the DS-0 bit rate 64 kb/s, while each higher-order tributary must be an integer multiple of the DS-1 bit rate. One possible set of bit rates which meet these criteria is as follows:

| DESIGNATION | NOMINAL STANDARD BIT RATE (kb/s) | # DS-0 EQUIV. BYTES PER 125 us | STUFFED RATE (kb/s) | NOMINAL STUFFING RATE (kb/s) | # DS-0 EQUIV. BYTES FOR STUFFED SIG. |
|---|---|---|---|---|---|
| DS-1 | 1544 | 24.125 | 1600 | 56 | 25 |
| DS-1C | 3152 | 49.250 | 3200 | 48 | 50 = (25 × 2) |
| DS-2 | 6312 | 98.675 | 6400 | 88 | 100 = (25 × 4) |
| DS-3 | 44736 | 699.000 | 44800 | 64 | 700 = (25 × 28) |
| DS-3 (alt.) | 44736 | 699.000 | 46400 | 1664 | 725 = |

| DESIGNATION | NOMINAL STANDARD BIT RATE (kb/s) | # DS-0 EQUIV. BYTES PER 125 us | STUFFED RATE (kb/s) | NOMINAL STUFFING RATE (kb/s) | # DS-0 EQUIV. BYTES FOR STUFFED SIG. |
|---|---|---|---|---|---|
| | | | | | (25 × 29) |

Referring again to FIG. 2, the multiplexed digital transmission system comprises a single-stage multiplexer 10 which multiplexes synchronous DS-1 and DS-2 and asynchronous DS-1C and DS-3 bit-stuffed tributaries onto a bus, generally 15, under control of a frame and multiplexer control generator 16 with each of the eight bits of each word from the most significant bit (MSB) to the least significant bit (LSB) being applied to a different lead. An additional 9th lead providing master frame control signals from the generator 16 is also added to the bus 15. This additional 9th bit can be used to make a parity check over the other 8 bits, transmitting odd parity for DS-0 channels, even parity for the frame/stuff word, giving an error monitoring capability as well as a frame indicator.

In this example, the bit stuffers 11 and 12 add 7 and 11 bits per frame to the DS-1 and DS-2 synchronous bit streams respectively. Bit stuffers 13 and 14 add nominally 6 and 8 bits to each frame of the asynchronous DS-1C and DS-3 bit streams respectively. This increases the designated NOMINAL STANDARD BIT RATE of each tributary to that shown in the column STUFFED RATE. Each frame of a stuffed DS-1 synchronous tributary consists of $k=25$ words each $n=8$ bits long for a total of $kn=200$ bits per frame. This can also be divided into $m=24$ eight bit channels, one synchronization bit and seven stuffed bits. The other synchronous tributaries DS-1C, DS-2, and DS-3 have respectively $jkn=50$, 100, and 700 bits per frame, where $j$ is the ratio of the channels per frame of that tributary as compared to the DS-1 tributary. Thus, frame aligned stuffing is used to build out signals to the point where they are harmonically related.

As further illustrated in FIG. 4 the multiplexer 10 utilizes word interleaving with each tributary contributing $j$ 9-bit words per 5 us sub-frame (8 data bits plus one control bit). Thus, $j=1$ for DS-1, 2 for DS-1C, 4 for DS-2, and 28 for DS-3. Since the number of words of a stuffed DS-1 tributary controls the sub-frame rate, each tributary must be accessed every 5 us for a master frame period of 125 us as shown in FIG. 4.

As illustrated in FIG. 2, a 9th sub-frame control bit is added to each 8-bit data word. This 9th bit simplifies sub-frame and master-frame recovery of each of the tributaries and readily identifies the location of the stuffed bits. However alternate techniques can be used such as by stuffing a unique sequence of bits which can also be readily identified and located. Each 9-bit word is converted in a parallel/serial converter 17 to form a 63,000 kb/s stream which is then sent by high speed transmission from a transmitter 18 to a receiver 20.

The location of the stuffed bits and hence the synchronization bits of each of the synchronous tributaries can be readily established by inserting a logic 1 every 25 sub-frames (i.e. 125 us) in the 9th bit of each of the words containing the stuffed bits, and a logic 0 in all of the other 9th bits in that tributary. The 9th bits can then be used to directly control the demultiplexing of that bit stream. With this arrangement, the synchronous tributaries need not be necessarily aligned with each other. As a result smaller buffers can be used during transmission with less network delays.

The 9th bit can also serve as a parity check for the other 8 bits of each channel. If an even parity check is made for the 24 channels while an odd parity check is made for the additional 25th channel containing the synchronization bit and the stuffed bits, the 9th bit can provide both frame synchronization and a parity check for the tributary.

With the asynchronous tributaries, bit stuffing occurs at slightly shorter intervals than that of each synchronous sub-frame. Thus in the case of a DS-1 asynchronous tributary 6 or 7 bits are stuffed every 184 bits so that the nominal number of stuffed bits is 7 in every 200 bits. For a synchronous bit stream, this would result in 14 frames of 6 stuffed bits and 11 frames of 7 stuffed in every 25 frames. By constantly monitoring and adjusting this ratio slightly, asynchronous bit streams can be interleaved and transmitted simultaneously with synchronous bit streams although the corresponding bits from each word in the asynchronous bit stream may occupy arbitrary positions on, perhaps even precess around the leads of the bus.

Figure 1:
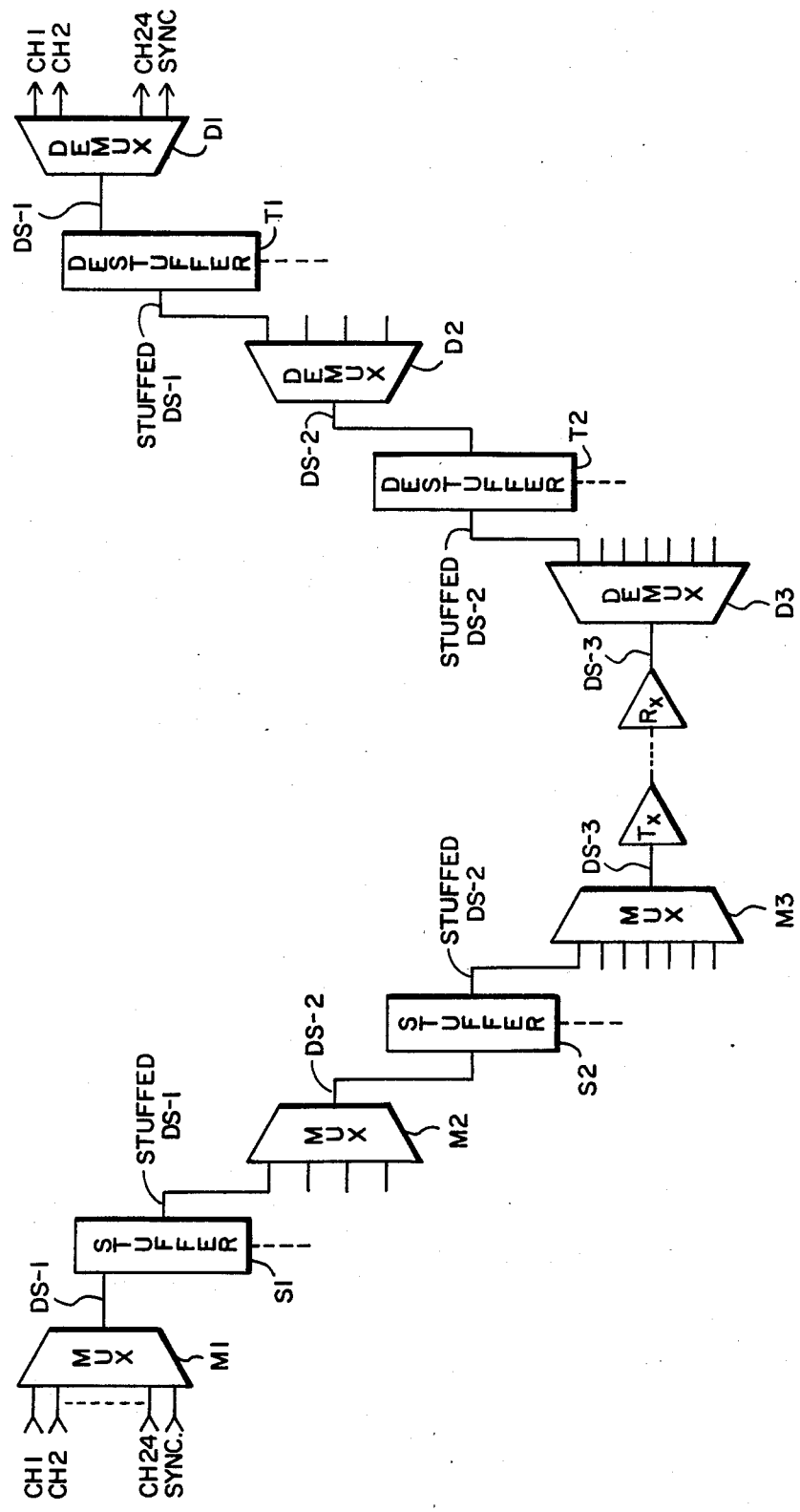
FIG. 1 is a block diagram of an exemplary portion of a typical prior art multiplexed digital transmission system.

The received digital signal is divided into 9-bit words by a serial/parallel converter 21 under control of signals from a frame and control recovery circuit 22 which utilizes the information from the 9th bit. The output is fed to a 9-lead bus, generally 23, in a demultiplexer 24. It is necessary to ensure the 9 bits of each incoming word are correctly entered on the 9 leads of the receiving bus 23 given that there are 9 possible phases of the incoming signal relative to the bus. This is achieved by monitoring line 9 for the correct repetition rate of stuff flag bits. As shown, direct access can be made to individual channels of either of the synchronous tributaries DS-1 or DS-2 (having a newly adopted format) from the channel demultiplexers 25 and 26 which are under control of signals from the control circuit 22. If, alternatively, access is only required to the entire synchronous or asynchronous tributary, it is only necessary to remove the stuffed bits in the destuffers 27 and 28 of the asynchronous DS-1C and DS-3 tributaries respectively, to gain direct access to them. Because they are asynchronous further processing in conventional destuffers and demultiplexers as shown in FIG. 1 can be employed to gain access to the individual channels of these tributaries. This system enables direct cross-connection of any of the individual channels of the synchronous tributaries DS-1 and DS-2, and cross-connection or routing of the entire asynchronous tributaries DS-1C and DS-3.

It will be evident that for the same high speed transmission bit rate 63,000 kb/s, various combinations of synchronous and/or asynchronous bit streams may be combined in the single-stage multiplexer 10. For instance twelve DS-1 tributaries could be combined with two DS-1C tributaries and three DS-2 tributaries in a multiplexed bit stream having the same bit rate 63,000 kb/s. Alternately the principles can be applied to other combinations of tributaries and high speed bit rates. For instance, channelised tributaries at proprietary bit rates such as originate from various manufacturers digital switches can be accommodated by stuffing them synchronously with their 125 us frame structure to occupy an integer number of complete 25 time slots and then placing them on the bus. In this event, it is evident that such a signal could be cross-connected at the channel or carrier level in the same manner as synchronous DS-1. In the present embodiment however, as shown in FIG. 4, each 125 us master frame comprising 875 words (7,875 bits), is divided into 25 sub-frames each having 35 words (315 bits), with the ratio of words per sub-frame allocated to each tributary being equal to the relative stuffed bit rates of the various tributaries.

FIG. 2 illustrates that the bit streams from the various tributaries are interleaved on a word or byte basis. Both bit interleaving and frame interleaving are also possible. However the former is not compatible with a preferred 8-bit wide bus structure (excluding the additional 9th control bit) which renders the overall capacity compatible with a low speed multiple access technical implementation. Thus the main reason for word interleaving rather than bit interleaving is that the resultant signal, when converted into a parallel bus is suitable for direct DS-0 or channel switching whereas a bit interleaved arrangement would require a complex protocol conversion to convert the signal into a word interleaved structure before it could be applied to a conventional DS-0 switch. Frame interleaving cannot be readily implemented due to the disparity of frame periods between the standard DS-1, DS-2 and DS-3 bit streams. Additionally with frame interleaving the length of the buffer store in each tributary and the size of the data memory and connection memory in any cross-connection of the tributaries becomes very large. Also the delay through the multiplexer is greater than 125 us. Each of the input bit streams, shown in FIG. 2 in serial form, may be directly multiplexed together using elastic registers in the stuffers 11, 12, 13, and 14, controlled by control signals as illustrated in FIG. 5 from the frame and multiplex control generator 16. Similar signals are generated by the frame and control recovery generator 22 for controlling the demultiplexers 25 and 26 and the destuffers 27 and 28.

FIG. 3, in conjunction with FIG. 6, illustrates in detail a DS-1 seven bit frame stuffer which can be operated in either a synchronous or asynchronous mode. With the exception of the number of channels and the bit rates, the same circuit arrangement can be used to provide bit-stuffing for the higher rate tributaries. Initially asynchronous operation will be described. As shown in FIG. 3, the incoming asynchronous DS-1 tributary is composed of 24 DS-0 channels which have been multiplexed together with synchronization bits in a conventional manner. The clock and digital signals are recovered in a conventional clock recovery circuit 41 and a digital data decoder 42 respectively. The incoming DS-1 data bits are written into a word buffer 43 under control of a write counter 44 which is clocked by the output from the clock recovery circuit 41.

As described above, the nominal number of stuffed bits per frame for a DS-1 signal is 7. However in order to handle asynchronous signals, the system must be capable of inserting more or less additional bits at selected intervals. This could be achieved by transmitting the incoming 1.544 Mb/s signal through an elastic store and inserting 6, 7, or 8 bits at the frame interval so that the bit rate is increased to a synchronous bit rate of 1.6 Mb/s. The 6, 7, or 8 bits must be encoded so that they can be readily identified and extracted at the receiving end of the system. However by shortening the frame interval and inserting the stuffed bits for the asynchronous bit stream at a slightly greater rate, it is only necessary to insert either 6 or 7 bits in the bit stream in order to raise the bit rate to that of the system stuffed bit rate of 1.6 Mb/s for a DS-1 tributary. In this system, the latter arrangement is used for bit stuffing asynchronous bit streams because it gives a lower level of residual waiting time jitter in the demultiplexed bit stream and because the different periodicity between the stuff word markers in the synchronous and asynchronous cases gives a built-in identifier to the demultiplexer as to the mode of multiplexing used at the multiplexer.

Referring again to FIGS. 3 and 6, a timing generator 40 derives a 1.6 Mb/s clock A signal from a 6.4 MHz system clock. Each alternative sub-frame has $p=23$ words each $n=8$ bits long for a total of $pn=184$ bits per sub-frame. During each 184 bit sub-frame, there are 178 incoming data bits followed by 6 stuffed bits, or 177 incoming data bits followed by 7 stuffed bits. If the incoming bit stream is exactly at the synchronous frequency, the total number of stuffed bits in a 184 bit sub-frame must average $7 \times 184/200 = 6.44$ bits. This ratio could then be achieved by stuffing 6 bits for 14 frames and 7 bits for 11 frames for a total of 161 stuffed bits every 25 184-bit sub-frames, which is equivalent to stuffing 7 bits in 23 200-bit sub-frames. This would result in the following sequence of bits being added over each twenty-five 184 bit alternative sub-frames.

... 7676767667676766767676766 ...

Depending upon the incoming bit rate of the asynchronous DS-1 tributary, this sequence of stuffed bits can vary anywhere from a minimum of 6 stuffed bits, to a maximum of 7 stuffed bits in every frame. The number of stuffed bits can be controlled by initially adding 6 bits at the end of each 184 bit frame. On demand, this number is increased to 7 bits per frame so that the correct ratio is maintained between the bit rates of the two bit streams. To achieve this, a sub-frame counter 51 which is responsive to the clock signal A, generates stuff control signals B and C. The control signal B ensures that at least 6 bits (i.e. during bit intervals 178–183) are added at the end of each sub-frame. This control signal B which is coupled through OR gate 47, in conjunction with clock signal A generates 6 bits of a 6–7 bit stuff control signal G at the output of AND gate 48. Concurrently it generates a 6-bit gap in the 1.6 Mb/s variable gapped clock H at the output of AND gate 50. When a phase comparator 46 which monitors the read R and write W control signals to the word buffer 43 determines that the word buffer 43 is emptying, it generates a control signal D, which combines with bit C in AND gate 49 to add one additional stuffed bit E immediately preceding the 6 stuffed bits. The 1.6 Mb/s clock signal H clocks a read counter 45, which controls the data being read out of the word buffer 43. This variable gapping of the read clock H prevents the word buffer 43 from over or underflowing and converts the DS-1 data rate from $1.544 \pm 0.00008$ Mb/s to 1.6 Mb/s.

The detailed operation of this buffer control loop is as follows. Whenever the read counter 45 output is zero, the value of the write counter 44 output is sampled by the phase comparator 46. If the write count is too low then the buffer 43 is getting empty (near underflow) so an add signal D is generated by the phase comparator 46, which produces an extra long gap in the read clock signal H at the output of an OR gate 50. This will fill the buffer 43 by one extra bit which will start to restore the correct amount of data in the buffer 43. By normally adding only 6 stuffed bits at the end of each 184-bit sub-frame, the buffer 43 can never fill (overflow) and hence the write count will never increase faster than the read count.

The data from the word buffer 43 has stuff bits added by an asynchronous stuffer OR gate 54 under control of stuff signal G. The coding in these stuffed bits G indicates whether the stuff is a long (1110011) or short (110011) one. The two zeros in the middle of each sequence of stuffed bits, are inserted under control of the control signal F. This signal, which is coupled to an inverted input of AND gate 48, blocks the gate 48 for a two bit interval. The output of the OR gate 54 goes through a switch 65 to a serial-to-parallel converter 62. The stuff control signal G is coupled through a switch 64 to a serial-to-parallel converter 62 to facilitate proper stuff word alignment. The 8-bit parallel output from the converter 62 is gated out to the bus via a gate 63.

The embodiment illustrated in FIG. 2 does not include an asynchronous DS-1 input signal. However, assuming the system were to transmit such a signal, it would be coupled to the 8-bit data bus 15 under control of multiplex control signals as illustrated in FIG. 5 from the generator 16. It will be evident that for asynchronous tributaries because the number of stuffed bits varies between 6 and 7, the relative bits from each word of the asynchronous bit stream can constantly precess around the bit bus 15 illustrated in FIG. 2. However, as the sub-frame length of 184 bits is an integral multiple of that of the bus 15, the stuffed bits will always appear on the same bus leads. As a result, by inserting a logic 1 from the frame control generator 16 on the 9th lead of the bus 15 every twenty-third word, concurrently with the insertion of the stuffed bits, the latter can be readily recovered at the receive end of the system. The number of stuffed bits can also be readily detected at the receiver by the repetitive coding of the stuff bits.

Figure 7:
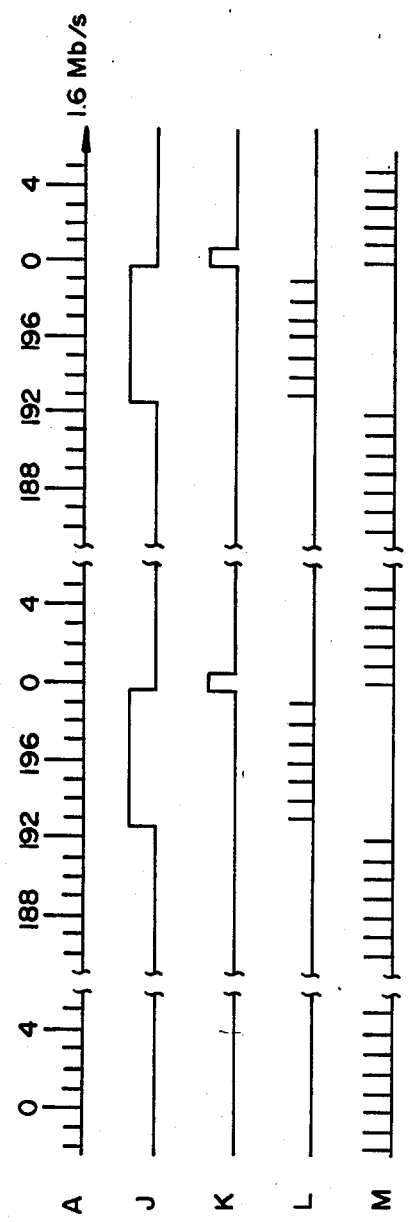

The frame stuffer illustrated in FIG. 3 can be converted to synchronous or plesiochronous operation by setting the switches 64 and 65 to their alternate positions. For fully synchronous operation, it is only necessary to insert 7 bits as shown in FIG. 7 immediately following the 193rd synchronization bit (which occurs during bit interval 192) at the end of each DS-1 frame to generate a 200 bit sub-frame. As illustrated in FIG. 2 the entire sub-frame is then coupled from the 7-bit frame stuffer 11 directly onto the 8-bit bus 15. Because the signal is totally synchronous, the relative bits from each word will always appear on the same leads of the bus 15.

In a plesiochronous system, where the frame speed is very slightly greater or less than the synchronous speed, an entire frame is either periodically added or deleted (depending on the rate at which the input differs from nominal) so as to maintain synchronism and hence synchronous properties, with the system. As illustrated in FIG. 3, this is accomplished by coupling the incoming DS-1 signal through the word buffer 43 to a 256 bit frame buffer 55. In this configuration, the word buffer 43 is used primarily to remove jitter from the incoming DS-1 signal and to edge synchronize the DS-1 clock with the system clock. The introduction of the 6 or 7-bit gaps in the buffer 43 are removed by the frame buffer 55, which has its write counter 56 under control of the same signal H from the OR gate 50 that is used to drive the READ counter 45 of the word buffer 43. A read counter 57 also coupled to the frame buffer 55 is under control of the output of an AND gate 53, which generates the 1.6 Mb/s Fixed Gap Clock M output from the A and J signals at the outputs of the generators 40 and 52.

The output of the frame buffer 55 is coupled to a frame recovery circuit 60 and a synchronous stuffer OR gate 61 which adds the seven stuff bits L from the output of AND gate 80. The stuffed DS-1 stream is sent from the OR gate 61 through the switch 65 to the serial-to-parallel converter 62 and then onto the 8-bit bus 15 via the gate 63. In the plesiochronous case, if the incoming data rate is slightly high, then the frame buffer 55 will begin to fill. A phase comparator 58, responsive to the control signal K, detects this condition by sampling the write count from the write counter 56 when the read count from the counter 57 is at bit zero of each frame. If the write count is too high, indicating that the 256 bit buffer 55 is filling, then the phase comparator 58 will output a delete signal DEL. A frame slip decision circuit 59 will then reset the 8-bit read counter 57 whenever circuit 59 reaches a count of 62 and signal K is high, (the latter occurs just after the last bit of each frame). Resetting the counter 57 to zero corresponds to adding 194 to the read count (62+194=256=0). This skips a frame on the 8-bit counter 57 which in turn bypasses one complete frame in the 256 bit buffer 55. The delete signal from the phase comparator 58 is also reset when the read counter 57 is reset. The reset must occur on the last bit of the frame so that one complete frame is skipped.

If the incoming data rate is low, then the frame buffer 55 will empty, which is detected by the phase comparator 58 as a low write count when the read counter 57 is at a count of zero during each frame. The comparator 58 then generates an insert signal INS, the decision circuit 59 then waits until the read count is 192 and signal J is high, and then resets the read counter 57 and the insert signal INS. Resetting the counter 57 to zero from 192 repeats a frame from the output of the 256-bit buffer 55, which effectively lowers the read rate from the buffer 55 to match the incoming DS-1 rate. The synchronous stuff control signal J is coupled through the switch 64 and is used by the serial-to-parallel converter 62 to provide word alignment on the bus 15 in FIG. 2.

The circuit arrangement for stuffing and multiplexing either asynchronous or synchronous bit streams from the other tributaries is substantially the same as that for the DS-1 tributaries with the exception that the bit rates and the number of stuffed bits differ. Referring again to FIG. 2, each of the frame stuffers 12, 13, and 14 for these tributaries is connected in a similar fashion to the main bus 15 in the multiplexer 10. However, as illustrated in FIGS. 4 and 5 the number of words which are coupled to the bus 15 during each sub-frame is directly proportional to the ratio j of the stuffed rate of the other tributary relative to that of the DS-1 tributary.

Both the demultiplexers 25, 26, and destuffers 27, 28, of the synchronous and asynchronous tributaries utilize conventional techniques. Frame synchronization and hence the location of the stuffed bits can be readily determined from the 9th bit which is added to the bus 15 in the transmitter and appears on the bus 23 in the receiver.

What is claimed is:

1. A digital transmission system comprising:

means including bit stuffing means, for time-division multiplexing bit streams from a plurality of tributaries into a multiplexed bit stream;

at least one of the bit streams from the plurality of tributaries being divisible into frames, each frame being divisible into a plurality of channels of equal bit length and having at least one additional overhead control bit;

characterized by:

the bit stuffing means inserts additional bits in each bit stream from the plurality of tributaries so that the number of bits per frame of said one bit stream in the multiplexed bit stream is an integer number of the number of bits per channel, and so that the number of bits per frame of each of the other bit streams in the multiplexed bit stream is an integer number of said number of bits per frame of said one bit stream long.

2. A digital transmission system as defined in claim 1 further characterized by:

each of the other bit streams is divisible into frames each frame being divisible into a plurality of channels of equal number of bits as that of said one bit stream;

the multiplexing means includes means for sequentially multiplexing the bits on a channel length bais from each tributary to form a sub-frame; and the ratio of bits from each tributary in each sub-frame being equal to the ratio of divisible channels per frame of their respective tributaries.

3. A digital transmission system for the transmission of bit streams from a plurality of tributaries, comprising:

means for time-division mutliplexing said bit streams into a multiplexed bit stream, at least one of the bit streams being divided into frames, each frame having m channels each n bits long and also having at least one additional control bit;

characterized by:

means for stuffing additional bits in said one bit stream to increase the resultant number of bits from the one stuffed frame in the multiplexed bit stream to kn, where k is a positive integer;

means for stuffing additional bits in each of the other bit streams to increase the resultant number of bits from each of the other stuffed frames in the multiplexed bit stream to jkn, where j is a positive integer for each of the other stuffed frames.

4. A digital transmission system as defined in claim 3 further characterized by:

the additional bits are stuffed contiguous to said control bit and the resultant number of bits kn is equal to (m+1)n bits.

5. A digital transmission system as defined in claim 3 further characterized by:

at least one of the other bit streams is asynchronous and is divided into alternative stuffed frames, each alternative frame having a nominal pn bits where p is a positive integer; and the stuffing means inserts additional bits in said alternative stuffed frames so that the ratio of the bits in the asynchronous bit stream to that of the one bit stream is equal to p/k.

6. A digital transmission system as defined in claim 3 further characterized by:

in said one bit stream:

the number of channels per frame m=24 the number of bits per channel n=8, and the total number of bits per stuffed frame including the control bit and the additional bits kn=200.

7. A digital transmission system as defined in claim 5 further characterized by:

in said one bit stream:

the number of channels per frame m=24 the number of bits per channel n=8, and the total number of bits per stuffed frame including the control bit and the additional bits kn=200, in the one other of the asynchronous bit streams, the number of channels per frame, the number of bits per channel and the total numbers of bits per stuffed frame are nominally equal to that of said one bit stream; and the total number of bits per alternative stuffed frame pn=184 so that the nominal ratio of the stuffed bits p:k=6.44:7.

8. A digital transmission system as defined in claim 3 further characterized by:

said one bit stream has a bit rate of 1544 kb/s and has a stuffed bit rate of 1600 kb/s which includes said additional bits; and one of said other bit streams has one of the bit rates 1544 kb/s, 3152 kb/s, 6312 kb/s, or 44736 kb/s, and stuffed bit rates of 1600 kb/s, 3200 kb/s, 6400 kb/s, or 44800 kb/s where j=1, 2, 4, and 28 respectively.

9. A digital transmission system as defined in claim 3 in which the means for time-division multiplexing the bit streams additionally includes:

a bus having at least n leads, means for coupling corresponding bits from each channel to corresponding leads on the bus.

10. A digital transmission system as defined in claim 9 in which the bus has an additional n+1th lead and the system additionally comprises:

means for coupling control signals to the n+1th lead in synchronism with the stuffed bits so as to facilitate recovery of the stuffed bits from the multiplexed bit stream.

* * * * *